(12) United States Patent
Anders et al.

(10) Patent No.: US 11,047,690 B2
(45) Date of Patent: Jun. 29, 2021

(54) AUTOMATED EMERGENCY RESPONSE

(71) Applicant: INTERNATIONAL BUSINESS MACHINES CORPORATION, Armonk, NY (US)

(72) Inventors: Kelley L. Anders, East New Market, MD (US); Jeremy R. Fox, Georgetown, TX (US); Grant D. Miller, Arvada, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/670,496

(22) Filed: Oct. 31, 2019

(65) Prior Publication Data
US 2020/0072614 A1 Mar. 5, 2020

Related U.S. Application Data

(63) Continuation of application No. 15/804,000, filed on Nov. 6, 2017, now Pat. No. 10,533,858.

(51) Int. Cl.
*G01C 21/20* (2006.01)
*G05D 1/00* (2006.01)
(Continued)

(52) U.S. Cl.
CPC ............ *G01C 21/206* (2013.01); *A62B 99/00* (2013.01); *G01J 5/0025* (2013.01); *G01S 13/86* (2013.01);
(Continued)

(58) Field of Classification Search
CPC .................................................. G01C 21/206
See application file for complete search history.

(56) References Cited

U.S. PATENT DOCUMENTS 7,089,084 B2 * 8/2006 Ohta ...................... B64C 33/00
700/245
8,346,578 B1 1/2013 Hopkins, III
(Continued)

FOREIGN PATENT DOCUMENTS

WO 2013141923 A2 9/2013
WO 2015084347 A1 6/2015

OTHER PUBLICATIONS

Friedman, Mark; List of IBM Patents or Patent Applications Treated as Related; 1 page.

*Primary Examiner* — Jean Paul Cass
(74) *Attorney, Agent, or Firm* — Schmeiser, Olsen & Watts; Nicholas L. Cadmus

(57) ABSTRACT

A method and system for automatically detecting a location is provided. The method includes receiving by a vehicle, data describing a specified geographical area of a collapsed structure. A received control signal enables control of the vehicle such that the vehicle initiates motion and navigates in a specified direction towards the specified geographical area and upon arriving at the specified geographical area, a size and a magnitude of the collapsed structure is determined via sensors of the vehicle. A center location of the collapsed structure is determined and the vehicle hovers above the center location. Geographical coordinates of the location above the center location are transmitted to a search and rescue system and the center location is scanned via ground penetrating radar. Open spaces within the collapsed structure are determined and scanned to locate living entities within the open spaces.

19 Claims, 5 Drawing Sheets

(51) Int. Cl.
    *G01S 13/88*     (2006.01)
    *G01J 5/00*     (2006.01)
    *G06T 7/70*     (2017.01)
    *A62B 99/00*     (2009.01)
    *G01S 13/86*     (2006.01)
    *H04N 5/33*     (2006.01)

(52) U.S. Cl.
    CPC .......... *G01S 13/885* (2013.01); *G05D 1/0027* (2013.01); *G05D 1/0038* (2013.01); *G05D 1/0088* (2013.01); *G06T 7/70* (2017.01); *H04N 5/33* (2013.01)

(56) References Cited

U.S. PATENT DOCUMENTS

| | | | | |
|---|---|---|---|---|
| 9,174,342 | B2* | 11/2015 | Pinter | G16H 40/67 |
| 9,265,192 | B2 | 2/2016 | Chan | |
| 9,440,353 | B1* | 9/2016 | da Silva | B62D 57/032 |
| 9,469,030 | B2* | 10/2016 | Wang | G06F 3/04842 |
| 9,541,641 | B2 | 1/2017 | Stolarczyk | |
| 9,571,789 | B2* | 2/2017 | Pinter | G11B 27/102 |
| 9,776,323 | B2* | 10/2017 | O'Sullivan | B25J 9/1666 |
| 9,785,149 | B2* | 10/2017 | Wang | G16H 40/67 |
| 9,797,415 | B2* | 10/2017 | Martinez | B25J 9/142 |
| 10,017,248 | B2* | 7/2018 | Samuel | B64C 39/024 |
| 10,061,896 | B2 | 8/2018 | Jordan | G16H 80/00 |
| 2004/0140404 | A1* | 7/2004 | Ohta | B64C 39/024 |
| | | | | 244/190 |
| 2005/0001720 | A1* | 1/2005 | Mason | G01S 5/0072 |
| | | | | 340/539.13 |
| 2005/0076054 | A1* | 4/2005 | Moon | H04L 67/12 |
| 2005/0096974 | A1* | 5/2005 | Chagoly | G08G 1/14 |
| | | | | 705/13 |
| 2005/0167588 | A1* | 8/2005 | Donnangelo | A61B 5/0536 |
| | | | | 250/307 |
| 2005/0219044 | A1* | 10/2005 | Douglass | G08B 25/00 |
| | | | | 340/506 |
| 2007/0139191 | A1* | 6/2007 | Quatro | G06Q 10/08 |
| | | | | 340/539.13 |
| 2008/0126403 | A1* | 5/2008 | Moon | G06F 16/27 |
| 2009/0100037 | A1* | 4/2009 | Scheibe | G06F 16/9537 |
| 2013/0099975 | A1* | 4/2013 | Cyganski | G01S 5/0205 |
| | | | | 342/432 |
| 2014/0368378 | A1 | 12/2014 | Crain | |
| 2015/0019267 | A1* | 1/2015 | Prieto | G06Q 10/067 |
| | | | | 705/4 |
| 2015/0077282 | A1 | 3/2015 | Mohamadi | |
| 2016/0026253 | A1* | 1/2016 | Bradski | H04N 13/344 |
| | | | | 345/8 |
| 2016/0119541 | A1* | 4/2016 | Alvarado-Moya | G06T 3/0018 |
| | | | | 348/38 |
| 2017/0088261 | A1 | 3/2017 | Sequeira | |
| 2017/0092109 | A1 | 3/2017 | Trundle et al. | |
| 2018/0000359 | A1* | 1/2018 | Watanabe | A61B 5/14552 |
| 2018/0026708 | A1* | 1/2018 | Priest | H04W 4/40 |
| | | | | 370/316 |
| 2018/0194463 | A1* | 7/2018 | Hasinski | B64C 39/024 |
| 2018/0286053 | A1* | 10/2018 | Labbe | H04N 21/440281 |
| 2018/0286105 | A1* | 10/2018 | Surti | H04N 13/239 |
| 2018/0288423 | A1* | 10/2018 | Vembar | H04N 19/167 |
| 2018/0338241 | A1* | 11/2018 | Li | G08B 5/222 |
| 2019/0137279 | A1 | 5/2019 | Anders | |

\* cited by examiner

AUTOMATED EMERGENCY RESPONSE

CROSS REFERENCE TO RELATED APPLICATIONS

This application is a continuation application claiming priority to Ser. No. 15/804,000 filed Nov. 6, 2017, now U.S. Pat. No. 10,533,858 issued Jan. 14, 2020, the contents of which are hereby incorporated by reference.

FIELD

The present invention relates generally to a method for deploying a vehicle for emergency response and in particular to a method and associated system directing a vehicle to towards a damaged structure and locating entities within the damaged structure.

BACKGROUND

Implementing rescue operations typically includes an inaccurate process with little flexibility. Typical rescue operations are unable to locate individuals that are not visible and typically involve an unreliable process that may be time consuming and require a large amount of resources. Accordingly, there exists a need in the art to overcome at least some of the deficiencies and limitations described herein above.

SUMMARY

A first aspect of the invention provides a location detection method comprising: receiving, by a processor of a first vehicle, data describing a specified geographical area of a collapsed structure; receiving, by the processor, a control signal enabling control of the first vehicle such that the first vehicle initiates motion and navigates in a specified direction towards the specified geographical area; upon arriving at the specified geographical area, determining by the processor via a plurality of sensors of the first vehicle, a size and a magnitude of the collapsed structure; determining, by the processor, a center location of the collapsed structure; maintaining, by the processor, the first vehicle at a location above the center location of the collapsed structure; transmitting, by the processor to a search and rescue system, geographical coordinates of the location above the center location of the collapsed structure; first scanning, by the processor via a ground penetrating radar device of the first vehicle, the center location of the collapsed structure; determining, by the processor in response to results of the first scanning, open spaces within the collapsed structure; second scanning, by the processor via a thermal imaging device of the first vehicle, the open spaces within the collapsed structure; and determining, by the processor in response to results of the second scanning, living entities located within the open spaces of the collapsed structure.

A second aspect of the invention provides a computer program product, comprising a computer readable hardware storage device storing a computer readable program code, the computer readable program code comprising an algorithm that when executed by a processor of a first vehicle implements a location detection method, the method comprising: receiving, by the processor, data describing a specified geographical area of a collapsed structure; receiving, by the processor, a control signal enabling control of the first vehicle such that the first vehicle initiates motion and navigates in a specified direction towards the specified geographical area; upon arriving at the specified geographical area, determining by the processor via a plurality of sensors of the first vehicle, a size and a magnitude of the collapsed structure; determining, by the processor, a center location of the collapsed structure; maintaining, by the processor, the first vehicle at a location above the center location of the collapsed structure; transmitting, by the processor to a search and rescue system, geographical coordinates of the location above the center location of the collapsed structure; first scanning, by the processor via a ground penetrating radar device of the first vehicle, the center location of the collapsed structure; determining, by the processor in response to results of the first scanning, open spaces within the collapsed structure; second scanning, by the processor via a thermal imaging device of the first vehicle, the open spaces within the collapsed structure; and determining, by the processor in response to results of the second scanning, living entities located within the open spaces of the collapsed structure.

A third aspect of the invention provides a first vehicle comprising a processor coupled to a computer-readable memory unit, the memory unit comprising instructions that when executed by the processor executes a location detection method comprising: receiving, by the processor, data describing a specified geographical area of a collapsed structure; receiving, by the processor, a control signal enabling control of the first vehicle such that the first vehicle initiates motion and navigates in a specified direction towards the specified geographical area;

upon arriving at the specified geographical area, determining by the processor via a plurality of sensors of the first vehicle, a size and a magnitude of the collapsed structure; determining, by the processor, a center location of the collapsed structure; maintaining, by the processor, the first vehicle at a location above the center location of the collapsed structure; transmitting, by the processor to a search and rescue system, geographical coordinates of the location above the center location of the collapsed structure; first scanning, by the processor via a ground penetrating radar device of the first vehicle, the center location of the collapsed structure;

determining, by the processor in response to results of the first scanning, open spaces within the collapsed structure; second scanning, by the processor via a thermal imaging device of the first vehicle, the open spaces within the collapsed structure; and determining, by the processor in response to results of the second scanning, living entities located within the open spaces of the collapsed structure.

The present invention advantageously provides a simple method and associated system capable of implementing rescue operations.

DETAILED DESCRIPTION

Figure 1:
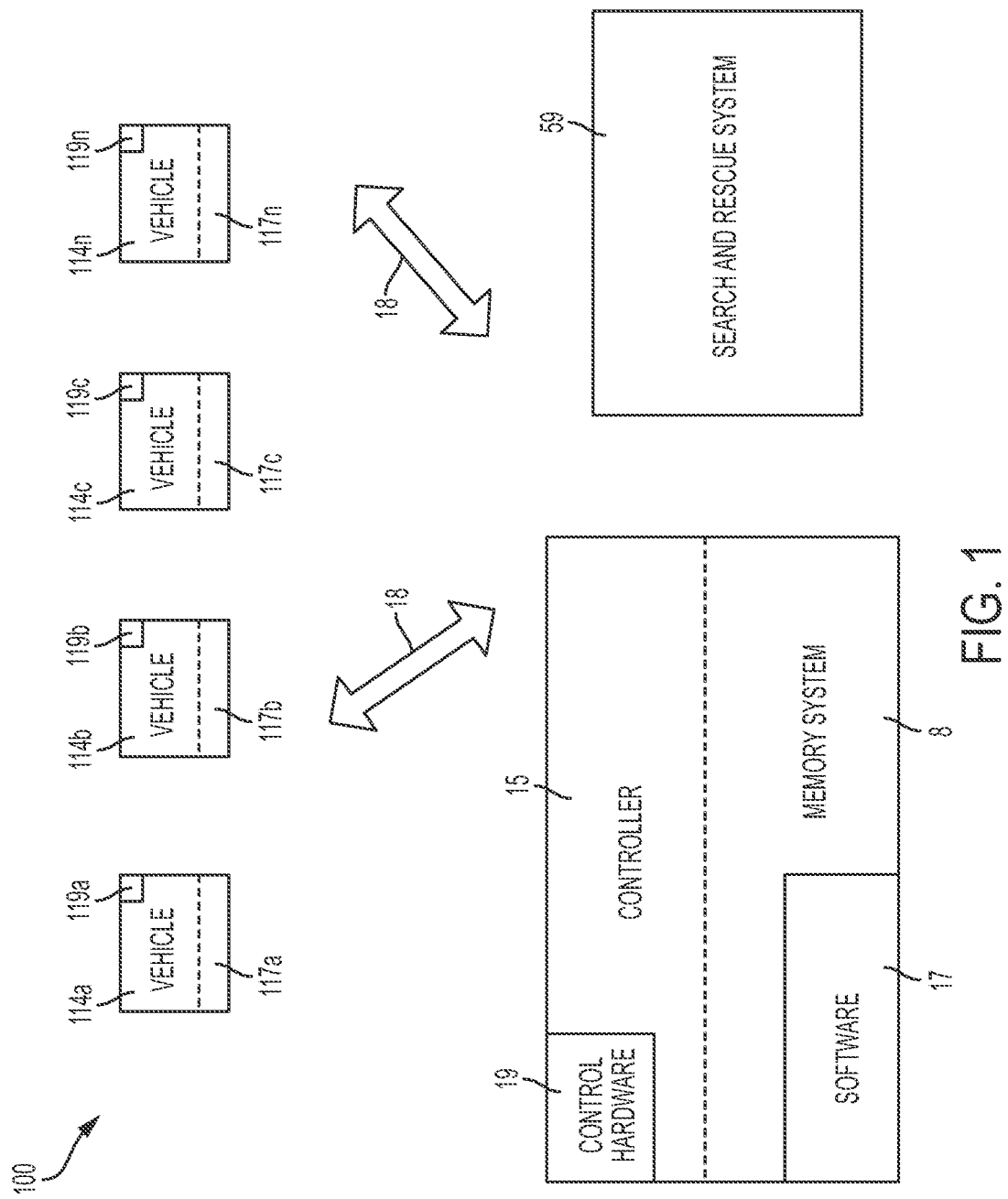
FIG. 1 illustrates a system for enabling a vehicular communication system for deployment with respect to locating entities located within a collapsed structure, in accordance with embodiments of the present invention.

FIG. 1 illustrates a system 100 for enabling a vehicular communication system for deployment with respect to locating entities located within a collapsed structure thereby assisting emergency responder rescues, in accordance with embodiments of the present invention. A collapsed structure may include, inter alia, a building, a bridge, etc. System 100 enables a process for automated control of vehicles 114a . . . 114n equipped with control hardware 119a . . . 119n (i.e., including a global position satellite (GPS) system) and sensor devices 117a . . . 117n (i.e., including, inter alia, a thermal imaging apparatus, optical and vibrational sensors, ground penetrating radar (GPR) for locating and differentiating between living entities (e.g., humans or any type of mammal or living being) and other inanimate objects. Additionally, system 1000 enables a process for determining open spaces within and the collapsed structure and a stability of the collapsed structure. System 100 is enabled to: derive a mathematical model to determine an optimal method of extraction and rescue of trapped entities; and display a heat map (e.g., via the graphical user interface (GUI) 300 FIG. 3) identifying a visual topography of the collapsed structure to identify trapped entities.

System 100 of FIG. 1 includes a controller 15 and a search and rescue system in communication with vehicles 114a . . . 114n (comprising sensor devices 117a . . . 117n such as, inter alia, a video camera, optical sensors, a thermal imaging apparatus/sensor, optical and vibrational sensors, ground penetrating radar (GPR), etc. and control hardware 119a . . . 119n comprising a GPS system or sensors sensor devices such as, inter alia, an optical sensor, a GPS sensor, etc.) via a wireless network 118. Vehicles 114a . . . 114n (i.e., control hardware 119a . . . 119n and sensor devices 117a . . . 117n internal to vehicles 114a . . . 114n) and controller 15 (i.e., control hardware 19) each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, vehicles 114a . . . 114n (i.e., control hardware 119a . . . 119n and sensor devices 117a . . . 117n internal to vehicles 114a . . . 114n vehicles) and control vehicle 15 (i.e., control hardware 19) may each comprise a specialized hardware device comprising specialized (non-generic) hardware and circuitry (i.e., specialized discrete non-generic analog, digital, and logic based circuitry) for executing a process described with respect to FIGS. 1-5. The specialized discrete non-generic analog, digital, and logic based circuitry may include proprietary specially designed components (e.g., a specialized integrated circuit, such as for example an Application Specific Integrated Circuit (ASIC) designed for only implementing an automated process for enabling a vehicular communication system for deployment with respect to locating entities located within a collapsed structure thereby assisting emergency responder rescues. Control vehicle 15 includes a memory system 8, software 17, and control hardware 19 (all sensors and associated control hardware for enabling software 17 to execute a process for automatically enabling a vehicular communication system for deployment with respect to locating entities located within a collapsed structure thereby assisting emergency responder rescues). Control hardware 19 may include sensors. Sensors may include, inter alia, GPS sensors, video recording devices, optical sensors, weight sensors, etc. Additionally, control hardware 19 may include a battery charging station for recharging batteries of vehicles 114a . . . 114n. The memory system 8 may include a single memory system. Alternatively, the memory system may include a plurality of memory systems. Each of vehicles 114a . . . 114n may comprise any vehicle that does not require a human operator to be located within the vehicles 114a . . . 114n such as, inter alia, a remote controlled vehicle (e.g., an aircraft flown by a pilot at a ground control station), an autonomously controlled vehicle (e.g., an aircraft controlled based on pre-programmed flight plans and may include an intelligence algorithm that would enable vehicles 114a . . . 114n to know it's location and self-determine a route to a collapsed structure), a pre-programmed vehicle, etc. Alternatively, vehicles 114a . . . 114n may comprise any type of vehicle that includes a human operator located within the vehicle (e.g., an aircraft, an automobile, a boat or ship, a train, etc.). Vehicles 114a . . . 114n may include, inter alia, an aerial vehicle, a land based vehicle, a marine (water) based vehicle, etc.

System 100 utilizes vehicles 114a . . . 114n to:

1. Locate living entities trapped by debris in a collapsed structure. For example, a structure may have been damaged or collapsed by an earthquake.

2. Determine a scope (in size, shape, and/or magnitude) of the collapsed structure.

3. Coordinate a group of vehicles 114a . . . 114n via a mapping process to conduct search and rescue operations utilizing GPS, thermal imaging, and GPR processes for locating and identifying entities for rescue.

Vehicles 114a . . . 114n are integrated with:

1. GPR devices for differentiating between living entities and inanimate object.

2. Thermal imaging devices for detecting a body temperature of the living entities.

3. Optical and vibrational sensors for determining a stability of a collapsed structure.

System 100 enables:

1. Network communications for communications with a GUI for presenting a visual topology presentation of the collapsed structure with respect to a heat map to identify the living entities.

2. Mathematical modeling software (e.g., hard coded into controller 15) for determining an optimal method for extraction and rescue of living entities.

3. An alert system for determining vehicle replacement.

Vehicle 114 comprises control hardware 119 and sensor devices 117 . . . 117n . . . 114n (i.e., an aerial vehicle) and controller 15 thereby enabling vehicles 114a . . . 114n to locate living entities trapped within a collapsed structure as follows:

Controller 15 determines (based on sensed and received information) that a building has collapsed due to an earthquake. In response, controller 15 deploys (via GPS) vehicles 114a . . . 114n to an area surrounding the collapsed building. Upon arrival to the collapsed building a lead vehicle (of vehicles 114a ... 114n) determines (via sensors) a size and magnitude of the collapsed building and calculates a center point on the collapse. The lead vehicle hovers over the center point and broadcasts the associated GPS coordinates and coverage area. Likewise all additional vehicle of vehicles 114a ... 114n are deployed across the coverage area from the center point outward such that all areas in the coverage area are covered for detection. In response, each of vehicles 114a ... 114n scans an associated coverage area via usage of:
1. GPR to determine open spaces within the collapsed building.
2. A thermal imaging device to determine a location and health of trapped living entities.
3. Optical and vibrational sensors to determine potential stable pathways for emergency responders. Additionally, the optical and vibrational sensors are configured to determine potential shifting areas (within the collapsed building) that could continue to collapse further.

Figure 2:
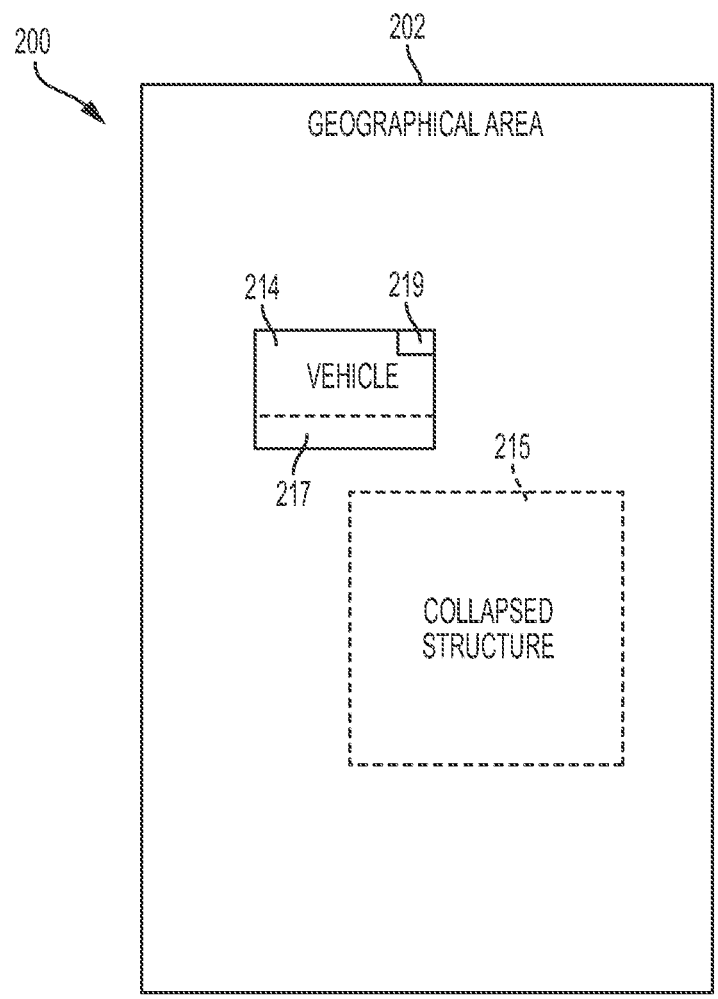
FIG. 2 illustrates a system comprising a vehicle enabled to navigate to a geographical area for a search and rescue operation associated with a living entity within a collapsed structure, in accordance with embodiments of the present invention.

FIG. 2 illustrates a system 200 comprising a vehicle 214 enabled to navigate to a geographical area 202 for a search and rescue operation associated with a living entity within a collapsed structure 215, in accordance with embodiments of the present invention. Vehicle 114 comprises control hardware 119 and sensor devices 117. The aforementioned process described with respect to FIG. 1 enables vehicle 214 to hover over a center point of collapsed structure 215 to scan for:
1. Open spaces within the structure 215.
2. A location and health of trapped living entities.
3. Potential stable pathways for emergency responders.

Figure 3:
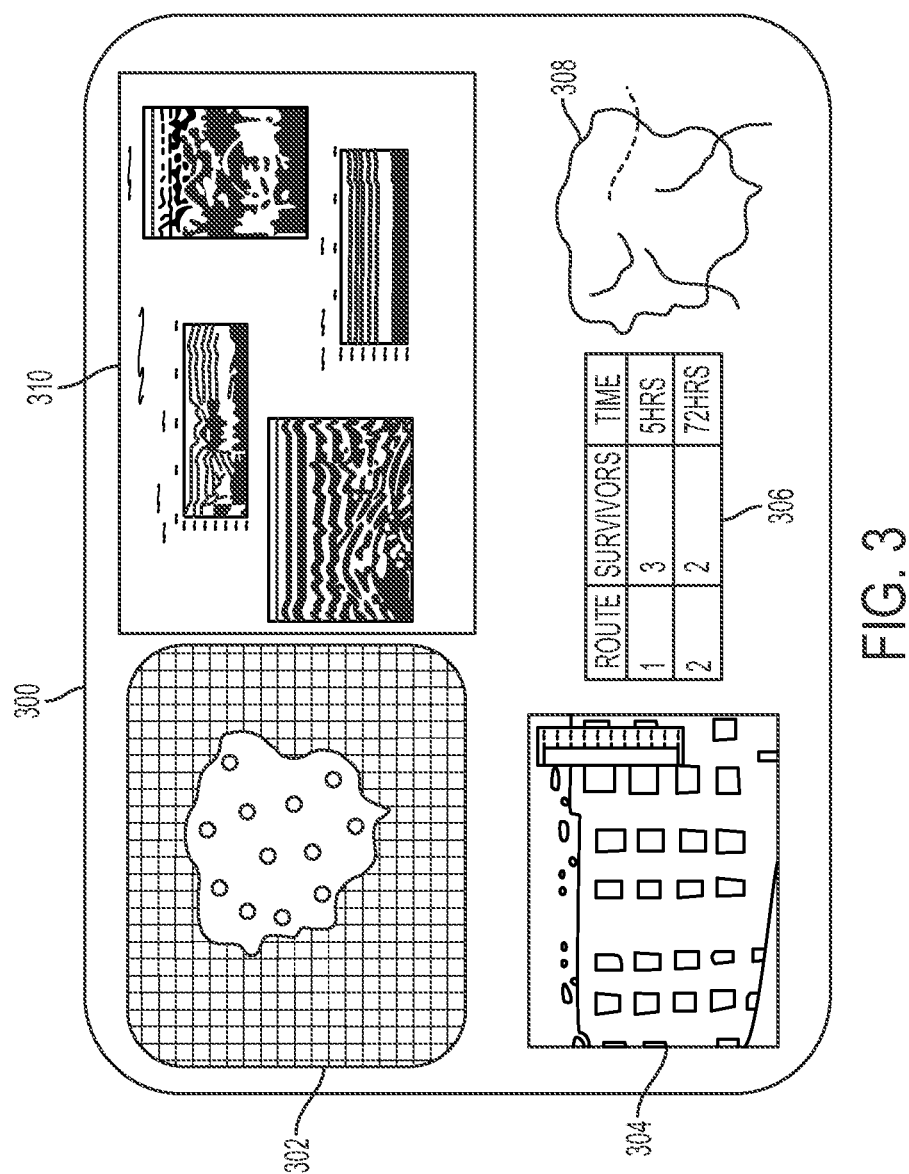
FIG. 3 illustrates a GUI for presenting results of the scanning process described in FIG. 1, in accordance with embodiments of the present invention.

FIG. 3 illustrates a GUI 300 for presenting results of the scanning process described in FIG. 1, in accordance with embodiments of the present invention. GUI 300 presents a vehicle deployment map 302 (presenting vehicles 302a ... 302n), a GPR map 310 illustrating differences between living entities and inanimate objects, a thermal imaging map 304 to determine trapped entities, a number of survivors per each determined rescue route 306, and optimal recue routes 308 for extracting living entities.

Figure 4:
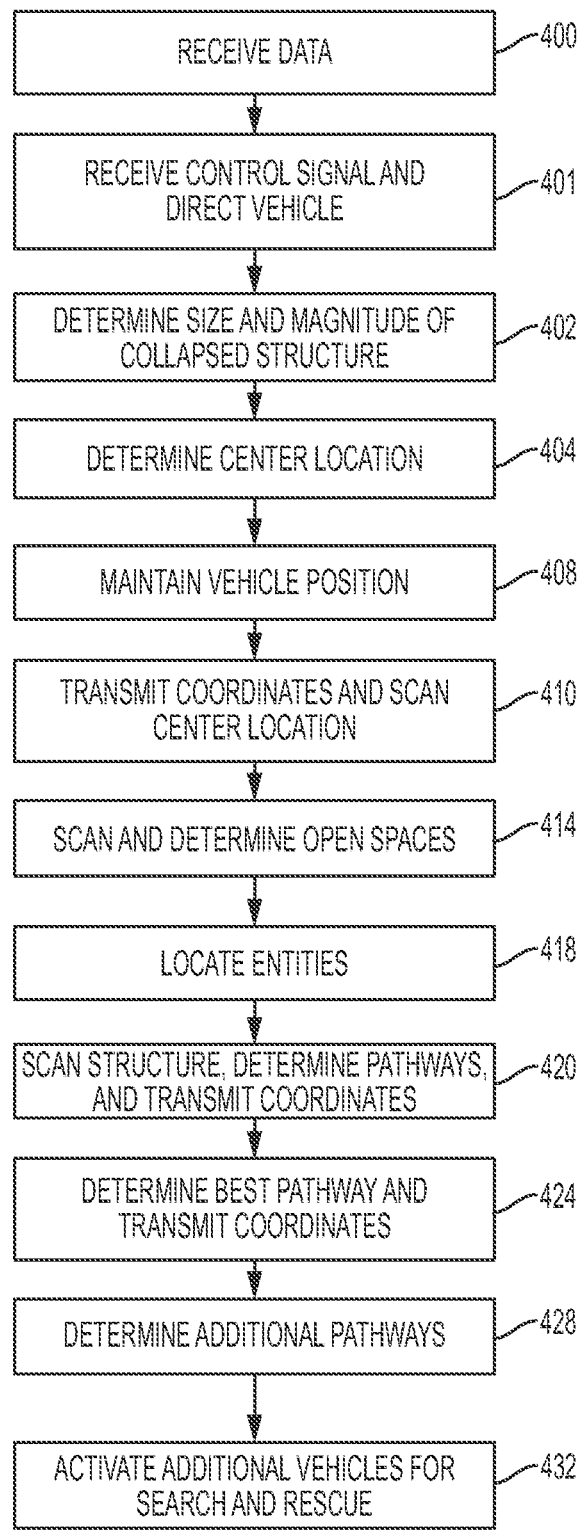
FIG. 4 illustrates an algorithm detailing a process flow enabled by the system of FIG. 1 for enabling a vehicular communication system for deployment with respect to locating entities located within a collapsed structure, in accordance with embodiments of the present invention.

FIG. 4 illustrates an algorithm detailing a process flow enabled by system 100 of FIG. 1 for enabling a vehicular communication system for deployment with respect to locating entities located within a collapsed structure, in accordance with embodiments of the present invention. Each of the steps in the algorithm of FIG. 4 may be enabled and executed in any order by a computer processor(s) or any type of specialized hardware executing computer code. In step 400, data describing a specified geographical area of a collapsed structure is received by a vehicle. In step 401, a control signal enabling control of the vehicle is received such that the vehicle initiates motion and navigates in a specified direction towards the specified geographical area. In step 404, a size and a magnitude of the collapsed structure is determined (upon arriving at the specified geographical area) via a plurality of sensors of the vehicle. In step 404, a center location of the collapsed structure is located. In step 408, the vehicle is directed to hover at a location above the center location of the collapsed structure. In step 410, geographical coordinates of the location above the center location of the collapsed structure are transmitted to a search and rescue system. Additionally, the center location is scanned via a ground penetrating radar device of the vehicle. In step 414, open spaces within the collapsed structure are determined and scanned via a thermal imaging device. In step 418, living entities located within the open spaces of the collapsed structure are determined based on results of steps 410 and 414. In step 420, the collapsed structure is scanned via optical sensors and vibrational sensors of the vehicle and stable pathways for accessing the open spaces within the collapsed structure are determined. Additionally, geographical coordinates of the living entities located within the open spaces of the collapsed structure and geographical coordinates of the stable pathways are transmitted to search and rescue system. In step 424, a first pathway of the stable pathways is determined. The first pathway is associated with a shortest timeframe (with respect to all other pathways of the stable pathways) for accessing the living entities located within open spaces within the collapsed structure. Coordinates of the first pathway are transmitted to the search and rescue system. The search and rescue system may present (via a GUI) images of: the open spaces within the collapsed structure; the living entities located within the open spaces of the collapsed structure; and the first pathway via a two dimensional image and/or a three dimensional image of the GUI. In step 428, additional stable pathways are determined and presented by the vehicle via the process described with respect to steps 410-424. In step 432, additional vehicles are deployed for determining additional living entities within additional open spaces within the collapsed structure.

Figure 5:
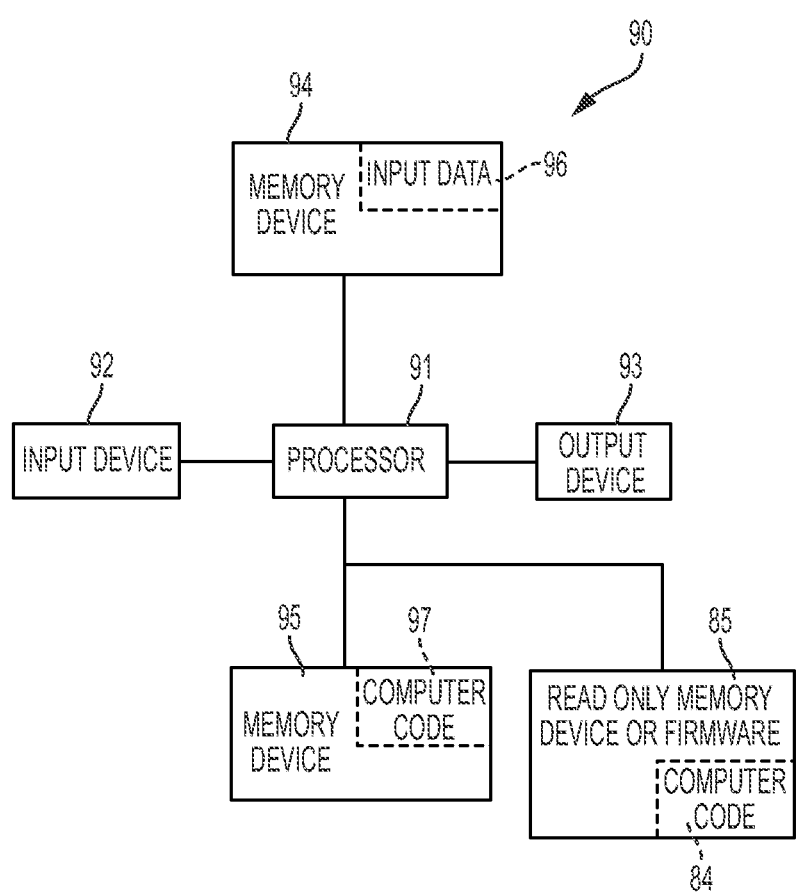
FIG. 5 illustrates a computer system used by or comprised by the system of FIG. 1 for enabling a vehicular communication system for deployment with respect to locating entities located within a collapsed structure, in accordance with embodiments of the present invention.

FIG. 5 illustrates a computer system 90 (e.g., controller vehicle 15 (i.e., control hardware 19 internal to controller vehicle 15) and vehicles 114a ... 114n (i.e., control hardware 119a ... 119n and sensors 117a ... 117n internal to vehicles 114a ... 114n) used by or comprised by the system of FIG. 1 for enabling a vehicular communication system for deployment with respect to locating entities located within a collapsed structure, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 4) for enabling a vehicular communication system for deployment with respect to locating entities located within a collapsed structure. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithm of FIG. 4) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including an algorithm) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a vehicular communication system for deployment with respect to locating entities located within a collapsed structure. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a vehicular communication system for deployment with respect to locating entities located within a collapsed structure. In another embodiment, the invention provides a business method that performs the process steps of the invention on a subscription, advertising, and/or fee basis. That is, a service supplier, such as a Solution Integrator, could offer to enable a vehicular communication system for deployment with respect to locating entities located within a collapsed structure. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties. While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A location detection method comprising:
  receiving, by a processor of a first vehicle, a control signal enabling control of said first vehicle such that said first vehicle initiates motion and navigates in a specified direction towards a specified geographical area of a collapsed structure;
  upon arriving at said specified geographical area, determining by said processor via a plurality of sensors of said first vehicle, a size, shape, and a magnitude of said collapsed structure;
  maintaining, by said processor, said first vehicle at a location above a center location of said collapsed structure;
  transmitting, by said processor to a search and rescue system, geographical coordinates of said location above said center location of said collapsed structure;
  first scanning, by said processor via a ground penetrating radar device of said first vehicle, said center location of said collapsed structure;
  determining, by said processor in response to results of said first scanning, open spaces within said collapsed structure;
  differentiating, by said processor in response to said first results, between living entities and inanimate objects located within said collapsed structure;
  second scanning, by said processor via a thermal imaging device of said first vehicle, said open spaces within said collapsed structure;
  determining, by said processor in response to results of said second scanning, a body temperature of said living entities located within said open spaces of said collapsed structure;
  determining, by said processor in response to results of said second scanning, a health condition of said living entities located within said open spaces of said collapsed structure;
  presenting, by said processor via a two dimensional image of a graphical user interface, heat map images identifying a visual topology of said collapsed structure, and wherein said heat map images present open spaces within said collapsed structure, said living entities located within said open spaces of said collapsed structure; and a pathway within said collapsed structure;
  determining, by said processor based on said heat map images and said magnitude of said collapsed structure, a stability of said collapsed structure;
  detecting, by said processor based on sensor retrieved data, potential shifting areas within said collapsed structure that may continue to further collapse; and
  presenting, by said processor via said graphical user interface, a vehicle deployment map presenting said first vehicle and a group vehicles, a ground penetrating radar map illustrating differences between said living entities and said inanimate objects, a thermal imaging map to determine trapped entities, a number of survivors per each determined rescue route, and optimal rescue routes, determined with respect to said stability of said collapsed structure and said potential shifting areas, for extracting said living entities based on said health condition of said living entities located within said open spaces of said collapsed structure.

2. The method of claim 1, further comprising:
  third scanning, by said processor via optical sensors and vibrational sensors and of said first vehicle, said collapsed structure;
  determining, by said processor in response to results of said third scanning, stable pathways for accessing said open spaces within said collapsed structure; and
  transmitting, by said processor to said search and rescue system, geographical coordinates of said living entities located within said open spaces of said collapsed structure and geographical coordinates of said stable pathways.

3. The method of claim 2, further comprising:
  determining, by said processor in response to results of said third scanning, a first pathway of said stable pathways, wherein said first pathway is associated with a shortest timeframe, with respect to all other pathways of said stable pathways, for accessing said living entities located within said open spaces within said collapsed structure; and transmitting, by said processor to said search and rescue system, geographical coordinates of said first pathway.

4. The method of claim 3, further comprising:
determining, by said processor in response to results of said third scanning, multiple additional pathways of said stable pathways, wherein said multiple additional pathways are associated with shortest timeframes, with respect to all further pathways of said stable pathways, for accessing said living entities located within said open spaces within said collapsed structure; and
transmitting, by said processor to said search and rescue system, geographical coordinates of said multiple additional pathways, wherein said search and rescue system further presents images of said multiple additional pathways via said two dimensional image of said graphical user interface.

5. The method of claim 3, further comprising:
transmitting, by said processor to a plurality of additional vehicles, said geographical coordinates of said location above said center location of said collapsed structure;
directing, by said processor, said plurality of additional vehicles in a specified direction towards said location above said center location of said collapsed structure;
directing, by said processor, said plurality of additional vehicles to locations surrounding said location above said center location of said collapsed structure;
maintaining, by said processor, said plurality of additional vehicles at said locations surrounding said location above said center location of said collapsed structure;
fourth scanning, by said processor via ground penetrating radar devices of said plurality of additional vehicles, said locations surrounding said location above said center location of said collapsed structure;
determining, by said processor in response to results of said fourth scanning, said open spaces within said collapsed structure;
fifth scanning, by said processor via thermal imaging devices of said additional vehicles, said open spaces within said collapsed structure; and
determining, by said processor in response to results of said fifth scanning, said living entities located within said open spaces of said collapsed structure;
sixth scanning, by said processor via optical sensors and vibrational sensors and of said additional vehicles, said collapsed structure;
determining, by said processor in response to results of said sixth scanning, said stable pathways for accessing said open spaces within said collapsed structure; and
transmitting, by said processor to said search and rescue system, data indicating said living entities located within said open spaces of said collapsed structure and said stable pathways.

6. The method of claim 3, wherein said search and rescue system presents images of: said open spaces within said collapsed structure, said living entities located within said open spaces of said collapsed structure; and stable pathways via a three dimensional image of said graphical user interface.

7. The method of claim 1, further comprising:
providing at least one support service for at least one of creating, integrating, hosting, maintaining, and deploying computer-readable code in the control hardware, said code being executed by the computer processor to implement: said retrieving said control signal, said determining said size and said magnitude, said maintaining, said transmitting, said first scanning, said determining said open spaces, and said determining said living entities.

8. A computer program product, comprising a computer readable hardware storage device storing a computer readable program code, said computer readable program code comprising an algorithm that when executed by a processor of a first vehicle implements a location detection method, said method comprising:
receiving, by said processor, a control signal enabling control of said first vehicle such that said first vehicle initiates motion and navigates in a specified direction towards a specified geographical area of a collapsed structure;
upon arriving at said specified geographical area, determining by said processor via a plurality of sensors of said first vehicle, a size, shape, and a magnitude of said collapsed structure;
maintaining, by said processor, said first vehicle at a location above a center location of said collapsed structure;
transmitting, by said processor to a search and rescue system, geographical coordinates of said location above said center location of said collapsed structure;
first scanning, by said processor via a ground penetrating radar device of said first vehicle, said center location of said collapsed structure;
determining, by said processor in response to results of said first scanning, open spaces within said collapsed structure;
differentiating, by said processor in response to said first results, between living entities and inanimate objects located within said collapsed structure;
second scanning, by said processor via a thermal imaging device of said first vehicle, said open spaces within said collapsed structure;
determining, by said processor in response to results of said second scanning, a body temperature of said living entities located within said open spaces of said collapsed structure;
determining, by said processor in response to results of said second scanning, a health condition of said living entities located within said open spaces of said collapsed structure;
presenting, by said processor via a two dimensional image of a graphical user interface, heat map images identifying a visual topology of said collapsed structure, and wherein said heat map images present open spaces within said collapsed structure, said living entities located within said open spaces of said collapsed structure; and a pathway within said collapsed structure;
determining, by said processor based on said heat map images and said magnitude of said collapsed structure, a stability of said collapsed structure;
detecting, by said processor based on sensor retrieved data, potential shifting areas within said collapsed structure that may continue to further collapse; and
presenting, by said processor via said graphical user interface, a vehicle deployment map presenting said first vehicle and a group vehicles, a ground penetrating radar map illustrating differences between said living entities and said inanimate objects, a thermal imaging map to determine trapped entities, a number of survivors per each determined rescue route, and optimal rescue routes, determined with respect to said stability of said collapsed structure and said potential shifting areas, for extracting said living entities based on said health condition of said living entities located within said open spaces of said collapsed structure.

9. The computer program product of claim 8, wherein said method further comprises:
   third scanning, by said processor via optical sensors and vibrational sensors and of said first vehicle, said collapsed structure;
   determining, by said processor in response to results of said third scanning, stable pathways for accessing said open spaces within said collapsed structure; and
   transmitting, by said processor to said search and rescue system, geographical coordinates of said living entities located within said open spaces of said collapsed structure and geographical coordinates of said stable pathways.

10. The computer program product of claim 9, wherein said method further comprises:
    determining, by said processor in response to results of said third scanning, a first pathway of said stable pathways, wherein said first pathway is associated with a shortest timeframe, with respect to all other pathways of said stable pathways, for accessing said living entities located within said open spaces within said collapsed structure; and
    transmitting, by said processor to said search and rescue system, geographical coordinates of said first pathway.

11. The computer program product of claim 10, wherein said method further comprises:
    determining, by said processor in response to results of said third scanning, multiple additional pathways of said stable pathways, wherein said multiple additional pathways are associated with shortest timeframes, with respect to all further pathways of said stable pathways, for accessing said living entities located within said open spaces within said collapsed structure; and
    transmitting, by said processor to said search and rescue system, geographical coordinates of said multiple additional pathways, wherein said search and rescue system further presents images of said multiple additional pathways via said two dimensional image of said graphical user interface.

12. The computer program product of claim 10, wherein said method further comprises:
    transmitting, by said processor to a plurality of additional vehicles, said geographical coordinates of said location above said center location of said collapsed structure;
    directing, by said processor, said plurality of additional vehicles in a specified direction towards said location above said center location of said collapsed structure;
    directing, by said processor, said plurality of additional vehicles to locations surrounding said location above said center location of said collapsed structure;
    maintaining, by said processor, said plurality of additional vehicles at said locations surrounding said location above said center location of said collapsed structure;
    fourth scanning, by said processor via ground penetrating radar devices of said plurality of additional vehicles, said locations surrounding said location above said center location of said collapsed structure;
    determining, by said processor in response to results of said fourth scanning, said open spaces within said collapsed structure;
    fifth scanning, by said processor via thermal imaging devices of said additional vehicles, said open spaces within said collapsed structure; and
    determining, by said processor in response to results of said fifth scanning, said living entities located within said open spaces of said collapsed structure;
    sixth scanning, by said processor via optical sensors and vibrational sensors and of said additional vehicles, said collapsed structure;
    determining, by said processor in response to results of said sixth scanning, said stable pathways for accessing said open spaces within said collapsed structure; and
    transmitting, by said processor to said search and rescue system, data indicating said living entities located within said open spaces of said collapsed structure and said stable pathways.

13. The computer program product of claim 10, wherein said method further comprises:
    wherein said search and rescue system presents images of: said open spaces within said collapsed structure, said living entities located within said open spaces of said collapsed structure; and stable pathways via a three dimensional image of said graphical user interface.

14. A first vehicle comprising a processor coupled to a computer-readable memory unit, said memory unit comprising instructions that when executed by the processor executes a location detection method comprising:
    receiving, by said processor, a control signal enabling control of said first vehicle such that said first vehicle initiates motion and navigates in a specified direction towards a specified geographical area of a collapsed structure;
    upon arriving at said specified geographical area, determining by said processor via a plurality of sensors of said first vehicle, a size, shape, and a magnitude of said collapsed structure;
    maintaining, by said processor, said first vehicle at a location above a center location of said collapsed structure;
    transmitting, by said processor to a search and rescue system, geographical coordinates of said location above said center location of said collapsed structure;
    first scanning, by said processor via a ground penetrating radar device of said first vehicle, said center location of said collapsed structure;
    determining, by said processor in response to results of said first scanning, open spaces within said collapsed structure;
    differentiating, by said processor in response to said first results, between living entities and inanimate objects located within said collapsed structure;
    second scanning, by said processor via a thermal imaging device of said first vehicle, said open spaces within said collapsed structure;
    determining, by said processor in response to results of said second scanning, a body temperature of said living entities located within said open spaces of said collapsed structure;
    determining, by said processor in response to results of said second scanning, a health condition of said living entities located within said open spaces of said collapsed structure;
    presenting, by said processor via a two dimensional image of a graphical user interface, heat map images identifying a visual topology of said collapsed structure, and wherein said heat map images present open spaces within said collapsed structure, said living entities located within said open spaces of said collapsed structure; and a pathway within said collapsed structure;

determining, by said processor based on said heat map images and said magnitude of said collapsed structure, a stability of said collapsed structure;

detecting, by said processor based on sensor retrieved data, potential shifting areas within said collapsed structure that may continue to further collapse; and presenting, by said processor via said graphical user interface, a vehicle deployment map presenting said first vehicle and a group vehicles, a ground penetrating radar map illustrating differences between said living entities and said inanimate objects, a thermal imaging map to determine trapped entities, a number of survivors per each determined rescue route, and optimal rescue routes, determined with respect to said stability of said collapsed structure and said potential shifting areas, for extracting said living entities based on said health condition of said living entities located within said open spaces of said collapsed structure.

15. The first vehicle of claim 14, wherein said method further comprises:

third scanning, by said processor via optical sensors and vibrational sensors and of said first vehicle, said collapsed structure;

determining, by said processor in response to results of said third scanning, stable pathways for accessing said open spaces within said collapsed structure; and transmitting, by said processor to said search and rescue system, geographical coordinates of said living entities located within said open spaces of said collapsed structure and geographical coordinates of said stable pathways.

16. The first vehicle of claim 15, wherein said method further comprises:

determining, by said processor in response to results of said third scanning, a first pathway of said stable pathways, wherein said first pathway is associated with a shortest timeframe, with respect to all other pathways of said stable pathways, for accessing said living entities located within said open spaces within said collapsed structure; and transmitting, by said processor to said search and rescue system, geographical coordinates of said first pathway.

17. The first vehicle of claim 15, wherein said method further comprises:

determining, by said processor in response to results of said third scanning, multiple additional pathways of said stable pathways, wherein said multiple additional pathways are associated with shortest timeframes, with respect to all further pathways of said stable pathways, for accessing said living entities located within said open spaces within said collapsed structure; and transmitting, by said processor to said search and rescue system, geographical coordinates of said multiple additional pathways, wherein said search and rescue system further presents images of said multiple additional pathways via said two dimensional image of said graphical user interface.

18. The first vehicle of claim 15, wherein said method further comprises:

transmitting, by said processor to a plurality of additional vehicles, said geographical coordinates of said location above said center location of said collapsed structure;

directing, by said processor, said plurality of additional vehicles in a specified direction towards said location above said center location of said collapsed structure;

directing, by said processor, said plurality of additional vehicles to locations surrounding said location above said center location of said collapsed structure;

maintaining, by said processor, said plurality of additional vehicles at said locations surrounding said location above said center location of said collapsed structure;

fourth scanning, by said processor via ground penetrating radar devices of said plurality of additional vehicles, said locations surrounding said location above said center location of said collapsed structure;

determining, by said processor in response to results of said fourth scanning, said open spaces within said collapsed structure;

fifth scanning, by said processor via thermal imaging devices of said additional vehicles, said open spaces within said collapsed structure; and determining, by said processor in response to results of said fifth scanning, said living entities located within said open spaces of said collapsed structure;

sixth scanning, by said processor via optical sensors and vibrational sensors and of said additional vehicles, said collapsed structure;

determining, by said processor in response to results of said sixth scanning, said stable pathways for accessing said open spaces within said collapsed structure; and transmitting, by said processor to said search and rescue system, data indicating said living entities located within said open spaces of said collapsed structure and said stable pathways.

19. The first vehicle of claim 15, wherein said method further comprises:

wherein said search and rescue system presents images of: said open spaces within said collapsed structure, said living entities located within said open spaces of said collapsed structure; and stable pathways via a three dimensional image of said graphical user interface.

* * * * *